United States Patent
Coatney et al.

(10) Patent No.: US 9,329,956 B2
(45) Date of Patent: May 3, 2016

(54) RETRIEVING DIAGNOSTICS INFORMATION IN AN N-WAY CLUSTERED RAID SUBSYSTEM

(71) Applicant: NetApp, Inc., Sunnyvale, CA (US)

(72) Inventors: Doug Coatney, Sunnyvale, CA (US); Hung Lu, Sunnyvale, CA (US)

(73) Assignee: NETAPP, INC., Sunnyvale, CA (US)

( * ) Notice: Subject to any disclaimer, the term of this patent is extended or adjusted under 35 U.S.C. 154(b) by 0 days.

(21) Appl. No.: 14/323,883

(22) Filed: Jul. 3, 2014

(65) Prior Publication Data
US 2015/0161018 A1 Jun. 11, 2015

Related U.S. Application Data (63) Continuation of application No. 11/950,077, filed on Dec. 4, 2007, now Pat. No. 8,806,509.

(51) Int. Cl.
G06F 11/20 (2006.01)
H04L 29/08 (2006.01)
G06F 11/07 (2006.01)

(52) U.S. Cl.
CPC ........ *G06F 11/2094* (2013.01); *G06F 11/0727* (2013.01); *G06F 11/0766* (2013.01); *H04L 67/1097* (2013.01)

(58) Field of Classification Search
None
See application file for complete search history.

(56) References Cited

U.S. PATENT DOCUMENTS

| | | | |
|---|---|---|---|
| 6,032,216 A | 2/2000 | Schmuck et al. | |
| 6,170,067 B1 | 1/2001 | Liu et al. | |
| 6,405,104 B1 * | 6/2002 | Dougherty | H02H 1/0061 700/292 |
| 7,624,144 B1 * | 11/2009 | Mitrov | 709/203 |
| 2004/0088405 A1 * | 5/2004 | Aggarwal | 709/224 |
| 2006/0212453 A1 | 9/2006 | Eshel et al. | |
| 2007/0110044 A1 * | 5/2007 | Barnes et al. | 370/360 |
| 2007/0124437 A1 * | 5/2007 | Chervets | H04L 41/0681 709/223 |
| 2007/0260609 A1 | 11/2007 | Tulyani | |
| 2008/0155091 A1 | 6/2008 | Gokhale et al. | |
| 2008/0172679 A1 * | 7/2008 | Shen et al. | 719/318 |

OTHER PUBLICATIONS

International Search Report on corresponding PCT application (PCT/US2008/085281) from International Searching Authority (KIPO) dated Jun. 24, 2009.
Schmuck et al.; "GPFS: A shared-Disk File System for large computing Clusters"; IBM Almaden Research Center, San Jose, CA; Proceedings of the Conference on File and Storage Technologies (FAST'02); Jan. 28-30, 2002; pp. 231-244.
(Continued)

*Primary Examiner* — Umut Onat
(74) *Attorney, Agent, or Firm* — Klein, O'Neill & Singh, LLP (57) ABSTRACT

A method and system for reading exception data by a storage server from a storage controller. An exception event is detected at the storage server. The storage server registers with the controller, such that only one storage server can read the exception data at a time. If the storage server is registered with the controller, the storage server reads the exception data. If the storage server does not successfully register with the controller, the controller keeps track of which storage servers have not read the exception data, to ensure that all storage servers can read the data.

21 Claims, 8 Drawing Sheets

(56) References Cited

OTHER PUBLICATIONS

International Preliminary Report on Patentability for Application No. PCT/US2008/085281 mailed on Jun. 8, 2010, 5 pages.

Written Opinion for Application No. PCT/US2008/085281 mailed on Jun. 24, 2009, 4 pages.

* cited by examiner

FIG. 6

RETRIEVING DIAGNOSTICS INFORMATION IN AN N-WAY CLUSTERED RAID SUBSYSTEM

CROSS-REFERENCE TO RELATED APPLICATION

This application is a continuation of U.S. patent application Ser. No. 11/950,077, entitled "RETRIEVING DIAGNOSTICS INFORMATION IN AN N-WAY CLUSTERED RAID SUBSYSTEM," filed on Dec. 4, 2007, and now issued as U.S. Pat. No. 8,806,509 on Aug. 12, 2014, which is hereby incorporated by reference in its entirety.

FIELD OF INVENTION

The present invention relates to computer storage systems, and more particularly, to a method and system for reading diagnostic data from a disk shelf controller.

BACKGROUND

A storage server (also known as a "filer") is a computer that provides storage services in both network attached storage (NAS) and storage area network (SAN) environments relating to the organization of information on storage devices, such as disks. The filer includes a storage operating system that implements a storage system to logically organize the information as a hierarchical structure of directories and files on the disks. Each "on-disk" file may be implemented as a set of disk blocks configured to store information, whereas the directory may be implemented as a specially-formatted file in which information about other files and directories are stored. A filer may be configured to operate according to a client/server model of information delivery to allow many clients to access files stored on the filer. In this model, the client may include an application, such as a file system protocol, executing on a computer that connects to the filer over a computer network. The computer network can include, for example, a point-to-point link, a shared local area network (LAN), a wide area network (WAN), or a virtual private network (VPN) implemented over a public network such as the Internet. Each client may request filer services by issuing file system protocol messages (in the form of packets) to the filer over the network.

A common type of file system is a "write in-place" file system, in which the locations of the data structures (such as inodes and data blocks) on disk are typically fixed. An inode is a data structure used to store information, such as metadata, about a file, whereas the data blocks are structures used to store the actual data for the file. The information contained in an inode may include information relating to: ownership of the file, access permissions for the file, the size of the file, the file type, and references to locations on disk of the data blocks for the file. The references to the locations of the file data are provided by pointers, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not overwrite data on disks. If a data block on disk is read from disk into memory and "dirtied" with new data, the data block is written to a new location on the disk to optimize write performance. A write-anywhere file system may initially assume an optimal layout, such that the data is substantially contiguously arranged on the disks. The optimal disk layout results in efficient access operations, particularly for sequential read operations. A particular example of a write-anywhere file system is the Write Anywhere File Layout (WAFL®) file system available from Network Appliance, Inc. The WAFL file system is implemented within a microkernel as part of the overall protocol stack of the filer and associated disk storage. This microkernel is supplied as part of Network Appliance's Data ONTAP® storage operating system, residing on the filer, that processes storage service requests from network-attached clients.

As used herein, the term "storage operating system" generally refers to the computer-executable code operable on a storage system that manages data access. The storage operating system may, in case of a filer, implement file system semantics, such as the Data ONTAP® storage operating system. The storage operating system can also be implemented as an application program operating on a general-purpose operating system, such as UNIX® or Windows®, or as a general-purpose operating system with configurable functionality, which is configured for storage applications as described herein.

Disk storage is typically implemented as one or more storage "volumes" that comprise physical storage disks, defining an overall logical arrangement of storage space. Currently available filer implementations can serve a large number of discrete volumes. Each volume is associated with its own file system and as used herein, the terms "volume" and "file system" are interchangeable.

The disks within a volume can be organized as a Redundant Array of Independent (or Inexpensive) Disks (RAID). RAID implementations enhance the reliability and integrity of data storage through the writing of data "stripes" across a given number of physical disks in the RAID group, and the appropriate storing of parity information with respect to the striped data. In the example of a WAFL® file system, a RAID 4 implementation is advantageously employed, which entails striping data across a group of disks, and storing the parity within a separate disk of the RAID group. As described herein, a volume typically comprises at least one data disk and one associated parity disk (or possibly data/parity) partitions in a single disk arranged according to a RAID 4, or equivalent high-reliability, implementation.

Network Environment

Figure 1:
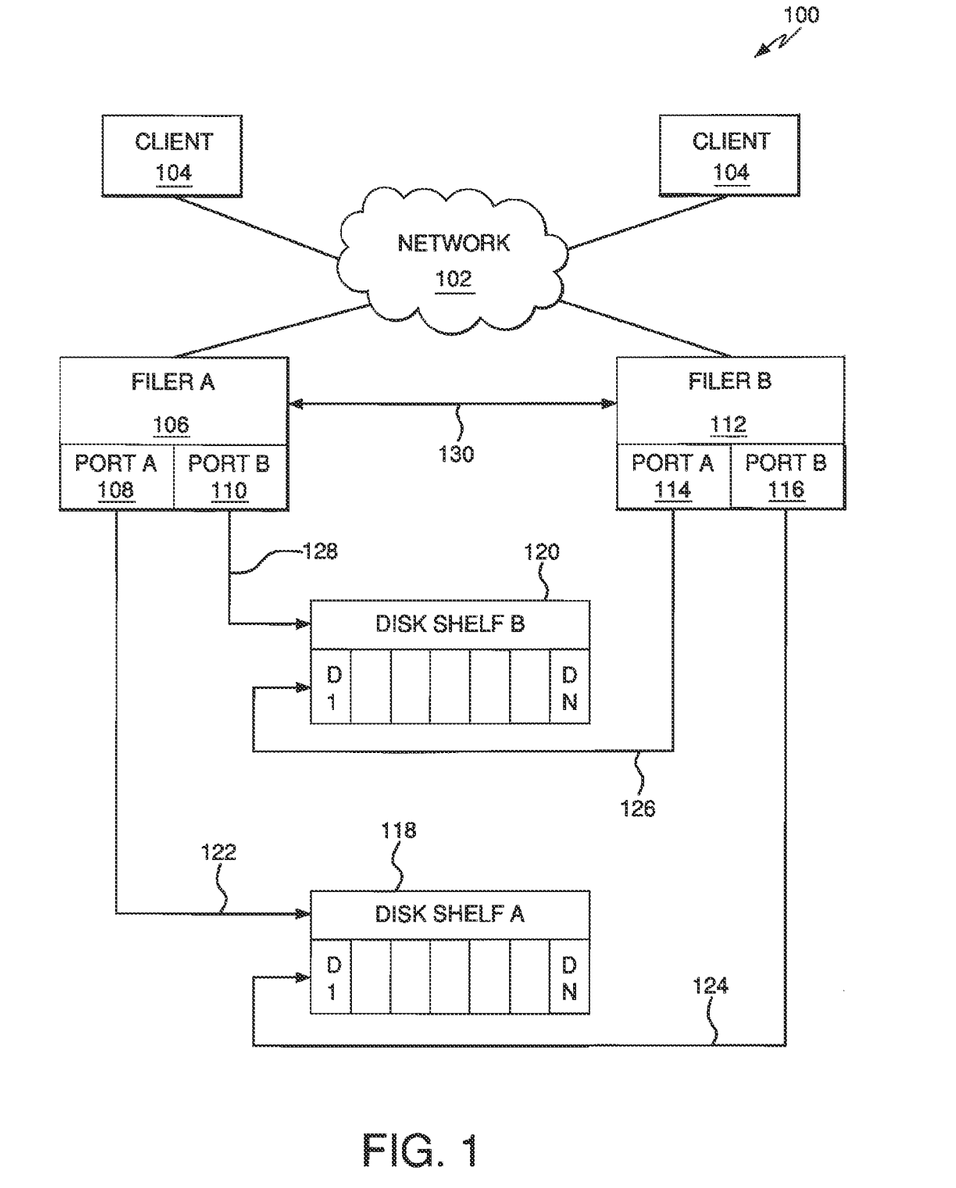
FIG. 1 is a block diagram of a network environment in which the present invention can be implemented.

FIG. 1 is a block diagram of an exemplary network environment 100 in which the principles of the present invention are implemented. The environment 100 is based around a network 102. The network 102 can be a local area network (LAN), a wide area network (WAN), a virtual private network (VPN) using communication links over the Internet, for example, or any combination of the three network types. For the purposes of this description, the term "network" includes any acceptable network architecture.

The network 102 interconnects a number of clients 104 and storage servers, or filers, 106, 112. These filers, including Filer A 106 and Filer B 112 form a storage server cluster. Each filer 106, 112 includes a plurality of data access ports which enable the storage server to connect to a plurality of disk loops. In FIG. 1, filer A 106 includes port A 108 and port B 110, and filer B 112 includes port A 114 and port B 116. Each storage server 106, 112 is connected to a Fibre Channel loop, including disk shelf A 118 and disk shelf B 120. Each disk shelf 118, 120 includes a number of storage devices D1-DN that operate in a manner known in the art. It should be understood that while only two filers and two disk shelves are shown in FIG. 1, multiple filers and disk shelves may be connected in a cluster configuration and operate in a similar manner.

Filer A 106 is connected to disk shelf A 118 over data connection path 122 via port A 108. Filer B 112 is connected to disk shelf A 118 over data connection path 124 via filer B's port B 116. Filer B 112 is connected to disk shelf B 120 over data connection path 126 via port A 114. Filer A 106 is connected to disk shelf B over data connection path 128 via filer A's port B 110. As shown in the embodiment of FIG. 1, the filer which is connected via its port A to a disk shelf is a primary storage server for the data stored on that disk shelf. The network topology described here is exemplary only, and it is noted that alternate network topologies may be utilized, e.g., via switches, using external RAID boxes, etc.

A client 104 may be a general-purpose computer, such as a PC, configured to execute applications and operating systems that include file system protocols such as Network File System (NFS) and Common Internet File System (CIFS). Moreover, each client 104 may interact with a filer 106, 112 in accordance with a client/server model of information delivery. That is, a client 104 may request the services of a filer 106, 112 to retrieve files requested by the client.

To implement a takeover in the event of failure of a filer, the filers 106, 112 can communicate with each other in a peer-to-peer capacity across one or more communication links, such as a cluster interconnect 130. The cluster interconnect 130 can utilize any communication medium and protocol, including, for example, a Fibre Channel or a ServerNet™ cluster interconnect.

Each filer 106, 112 includes one or more controllers (not shown). In some situations, a controller has information that needs to be accessed. There is a need for a high-level abstraction, where only one filer retrieves the data from the controller of a particular disk shelf and then makes the data available across the network in a distributed fashion instead of distributing the data at the controller level.

SUMMARY

A solution to the exception data available (EDA) data fragmentation problem is to use the controller to provide a means to allow two or more filers to coordinate access to the data. Using the filer ID as a semaphore, a filer can obtain the access right to the EDA to retrieve the data while blocking out the other filers. For example, when filer 1 detects the EDA, it sets its filer ID on the controller by sending a registration request to the controller. Filer 2 also detects the EDA and attempts to set its filer ID on the controller. If the controller accepts the registration request for filer 1, filer 1 wins the access right and can retrieve the data. Filer 2 needs to wait until filer 1 completes retrieving the data and releases its filer ID before filer 2 can begin retrieving the data.

BRIEF DESCRIPTION OF THE DRAWINGS

A more detailed understanding of the invention may be had from the following description of preferred embodiments, given by way of example, and to be understood in conjunction with the accompanying drawings, wherein.

DETAILED DESCRIPTION OF THE PREFERRED EMBODIMENTS

In some situations, a storage controller has information that needs to be accessed, for example after an exception event. An exception event is the controller's way of telling the filers that something out of the ordinary has occurred, for example, an error. An exception event includes any event that results in the collection of logging data or diagnostic data to be taken by the controller. By using an exception event as a trigger mechanism, the controller asynchronously signals the filer that something went wrong and that there is additional data available in a log file that the filer should to record to process the event. The data can be transmitted to a centralized support center for root cause analysis of the problem. The diagnostics information that is retrieved can include, but is not limited to, application specific integrated circuit (ASIC) specific failures, memory subsystem failures, processor failures, etc.

In an N-way clustering environment (for example, as shown in FIG. 1), a problem exists in that all of the filers in the cluster want to retrieve the data about the exception event. If one of the filers retrieves the information, only that filer has the information. To simplify diagnosing the exception event, every filer in the cluster should have access to all of the diagnostic data, instead of only one filer having the complete information. When an exception occurs on a disk shelf controller, the controller asserts an EDA (exception data available) bit in the SES (SCSI Enclosure Services) configuration status page. It is noted that the EDA bit is an arbitrary assignment and name, and is a vendor-specific bit which is set to indicate that some additional information is available. The process of retrieving the additional information is performed via vendor-specific commands as well. In the example shown in FIG. 1, a vendor-specific bit is placed on a standard page, which indicates that specific data is to be retrieved from some vendor-specific pages. The SesAdmin thread, which is a process running on an operating system on the filer, detects that the EDA bit has been set and attempts to retrieve the EDA data. The data is then analyzed to diagnose what caused the exception to occur.

Unlike a storage controller used in an ATA/SATA-based storage enclosure (e.g., a Fibre Channel to SATA bridged solution), the EDA data returned by a storage controller used in a Fibre Channel-based storage enclosure (e.g., an ESH4 controller) is not in a single packet, but rather is in a multi-frame format. To retrieve the complete EDA data from a native Fibre Channel storage shelf, the filer needs to send successive status read requests until a stop bit is detected in the status page which signals that the controller has read the last frame. The multi-frame read operation poses a problem if two or more filers connected to the same disk shelf attempt to retrieve the EDA data, as there is no existing mechanism to synchronize the EDA access among the filers.

Existing methods of distributing the diagnostic data do not account for multiple filers in the cluster. The notion is that the status is set (i.e., the controller generates an exception event) and then all N filers in the cluster immediately try to retrieve the data. The controller does not know which filer is trying to read what data and so the controller just serves the data. For example, suppose that there are ten pages of diagnostic data associated with the exception event. The controller has no knowledge of which filer is reading which pages of the data. If there are ten filers, then all ten filers could send a request to retrieve the data. Out of the ten filers, each filer could get one of the ten pages of data. Each filer would then need to try to assemble the data from the output of all ten filers. In other words, each filer could retrieve only a small portion of the diagnostic data and it might not be possible to determine where all the data went. This makes it difficult to analyze the problem at any given filer, as the data on each filer is fragmented. Using clustered failover to synchronize the EDA access among the filers is not a viable solution, because when the cluster interconnect is down, the original problem of fragmenting the data still exists.

The controller only knows that out of the total number of filers that were retrieving the data, one filer retrieved some amount of data and the other filers retrieved some other portion of the data. It is non-deterministic as to which filer gets what data, which is the problem with existing solutions. Some solutions have proposed that only one filer retrieves the data and then synchronizes the data at other levels. The reason for synchronizing at other levels is because the firmware at the controller is not designed to synchronize the data.

After the storage server detects an exception event, the storage server attempts to register with the controller to be able to read the exception data. The controller uses a contention mechanism to control access to the exception data, such that one storage server at a time can read the data. In one embodiment, the storage server attempts to register a token with the controller. If the storage server successfully registers its token, it can read the exception data. If the storage server does not successfully register its token, the controller keeps track of which storage servers have not read the exception data, to ensure that all storage servers can read the data.

Storage Server

Figure 2:
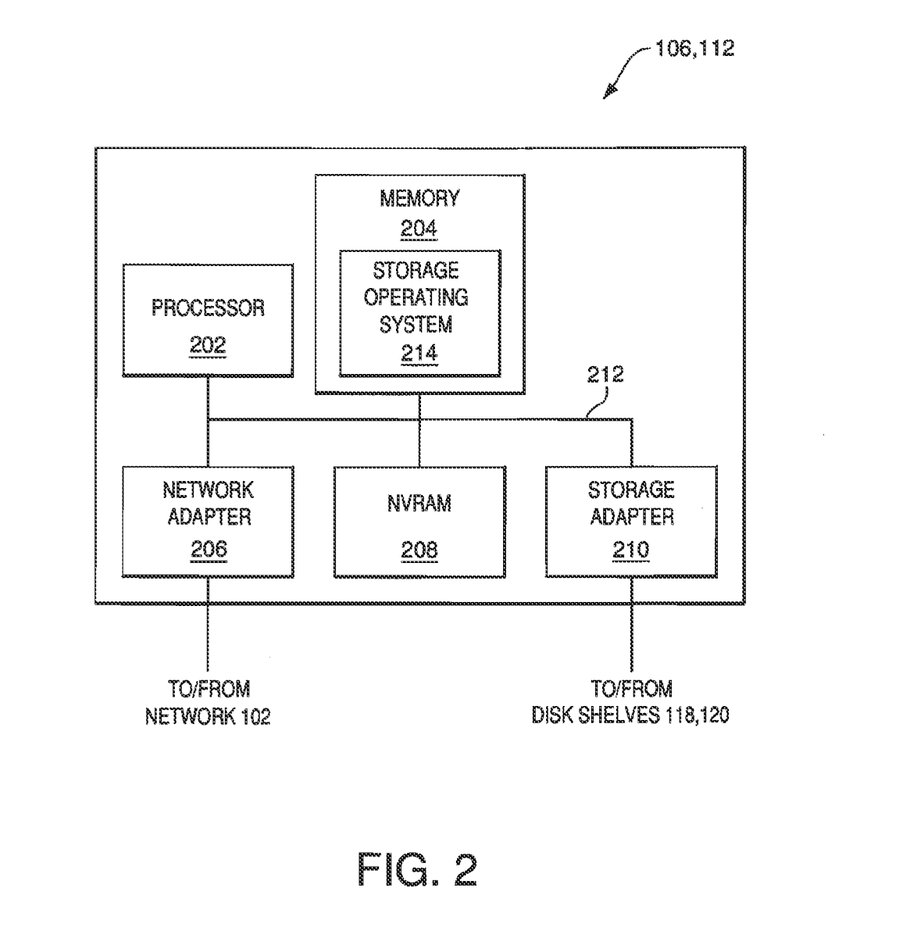
FIG. 2 is a block diagram of the storage server shown in FIG. 1.

FIG. 2 is a detailed block diagram of an exemplary storage server ("filer") 106, 112. It will be understood by one skilled in the art that the inventive concepts described herein apply to any type of storage server, wherever implemented, including on a special-purpose computer, a general-purpose computer, or a standalone computer.

The storage server 106, 112 includes a processor 202, a memory 204, a network adapter 206, a nonvolatile random access memory (NVRAM) 208, and a storage adapter 210, all of which are interconnected by a system bus 212. Contained within the memory 204 is a storage operating system 214 that implements a file system to logically organize the information as a hierarchical structure of directories and files on the disk shelves 118, 120. In an exemplary embodiment, the memory 204 is addressable by the processor 202 and the adapters 206, 210 for storing software program code. The operating system 214, portions of which are typically resident in the memory 204 and executed by the processing elements, functionally organizes the filer by invoking storage operations in support of a storage service implemented by the filer.

The network adapter 206 includes mechanical, electrical, and signaling circuitry needed to connect the filer 106, 112 to clients 104 over the network 102. The clients 104 may be general-purpose computers configured to execute applications, such as database applications. Moreover, the clients 104 may interact with the filer 106, 112 in accordance with a client/server information delivery model. That is, the client 104 requests the services of the filer 106, 112, and the filer 106, 112 returns the results of the services requested by the client 104 by exchanging packets defined by an appropriate networking protocol.

The storage adapter 210 interoperates with the storage operating system 214 and the disk shelves 118, 120 to access information requested by the client 104. The storage adapter 210 includes input/output (I/O) interface circuitry that couples to the disk shelves 118, 120 over an I/O interconnect arrangement, such as a Fibre Channel link. The information is retrieved by the storage adapter 210 and, if necessary, is processed by the processor 202 (or the adapter 210 itself) prior to being forwarded over the system bus 212 to the network adapter 206, where the information is formatted into appropriate packets and returned to the client 104.

In one exemplary implementation, the filer 106, 112 includes a non-volatile random access memory (NVRAM) 208 that provides fault-tolerant backup of data, enabling the integrity of filer transactions to survive a service interruption based upon a power failure or other fault.

Storage Operating System

To facilitate the generalized access to the disk shelves 118, 120, the storage operating system 214 implements a write-anywhere file system that logically organizes the information as a hierarchical structure of directories and files on the disks. As noted above, in an exemplary embodiment described herein, the storage operating system 214 is the NetApp® Data ONTAP® operating system available from Network Appliance, Inc., that implements the WAFL® file system. It is noted that any other appropriate file system can be used, and as such, where the terms "WAFL®" or "file system" are used, those terms should be interpreted broadly to refer to any file system that is adaptable to the teachings of this invention.

Figure 3:
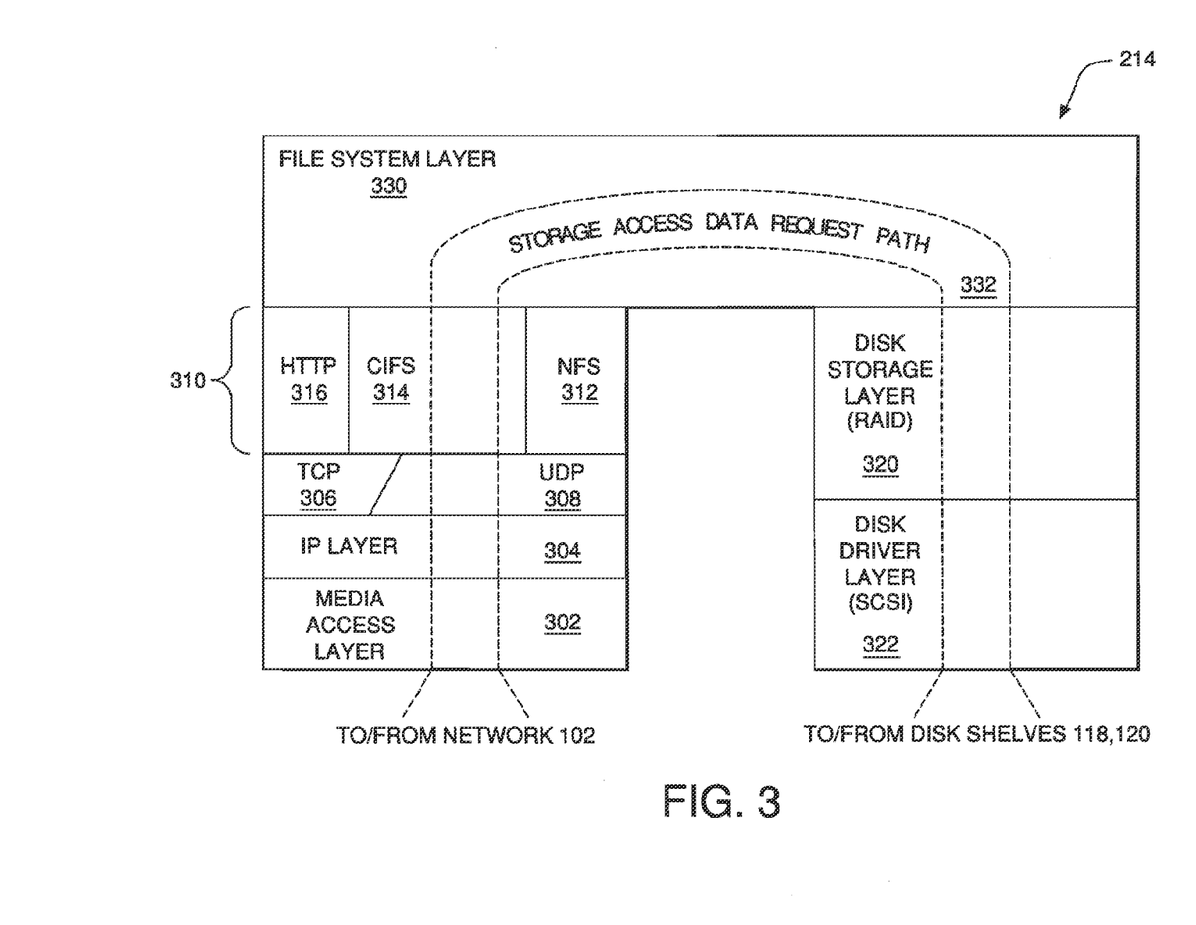
FIG. 3 is a block diagram of the storage operating system shown in FIG. 2.

Referring now to FIG. 3, the storage operating system 214 consists of a series of software layers, including a media access layer 302 of network drivers (e.g., an Ethernet driver). The storage operating system 214 further includes network protocol layers, such as an Internet Protocol (IP) layer 304 and its supporting transport mechanisms, a Transport Control Protocol (TCP) layer 306 and a User Datagram Protocol (UDP) layer 308.

A file system protocol layer 310 provides multi-protocol data access and includes support for the NFS protocol 312, the CIFS protocol 314, and the Hyper Text Transfer Protocol (HTTP) 316. In addition, the storage operating system 214 includes a disk storage layer 320 that implements a disk storage protocol, such as a redundant array of independent disks (RAID) protocol, and a disk driver layer 322 that implements a disk access protocol such as, e.g., a Small Computer System Interface (SCSI) protocol.

Bridging the disk software layers 320-322 with the network and file system protocol layers 302-316 is a file system layer 330. Generally, the file system layer 330 implements a file system having an on-disk format representation that is block-based using data blocks and inodes to describe the files.

In the storage operating system 214, a data request path 332 between the network 102 and the disk shelves 118, 120 through the various layers of the operating system is followed. In response to a transaction request, the file system layer 330 generates an operation to retrieve the requested data from the disk shelves 118, 120 if the data is not resident in the filer's memory 204. If the data is not in the memory 204, then the file system layer 330 indexes into an inode file using the inode number to access an appropriate entry and retrieve a logical volume block number. The file system layer 330 then passes the logical volume block number to the disk storage layer 320. The disk storage layer 320 maps the logical number to a disk block number and sends the disk block number to an appropriate driver (for example, an encapsulation of SCSI implemented on a Fibre Channel disk interconnection) in the disk driver layer 322. The disk driver accesses the disk block number on the disk shelves 118, 120 and loads the requested data in the memory 204 for processing by the filer 106, 112. Upon completing the request, the filer 106, 112 (and storage operating system 214) returns a reply, e.g., an acknowledgement packet defined by the CIFS specification, to the client 104 over the network 102.

It is noted that the storage access request data path 332 through the storage operating system layers described above may be implemented in hardware, software, or a combination of hardware and software. In an alternate embodiment of this invention, the storage access request data path 332 may be implemented as logic circuitry embodied within a field programmable gate array (FPGA) or in an application specific integrated circuit (ASIC). This type of hardware implementation increases the performance of the storage services provided by the filer 106, 112 in response to a file system request issued by a client 104.

Method for Reading Exception Data from a Storage Controller

The present invention is designed to work with the disk shelf that is the back end file service, as opposed to a front end client. Therefore, the invention can operate in either a network attached storage (NAS) or a storage area network (SAN) environment. The disk controller described herein refers to any type of disk shelf controller.

Figure 4A:
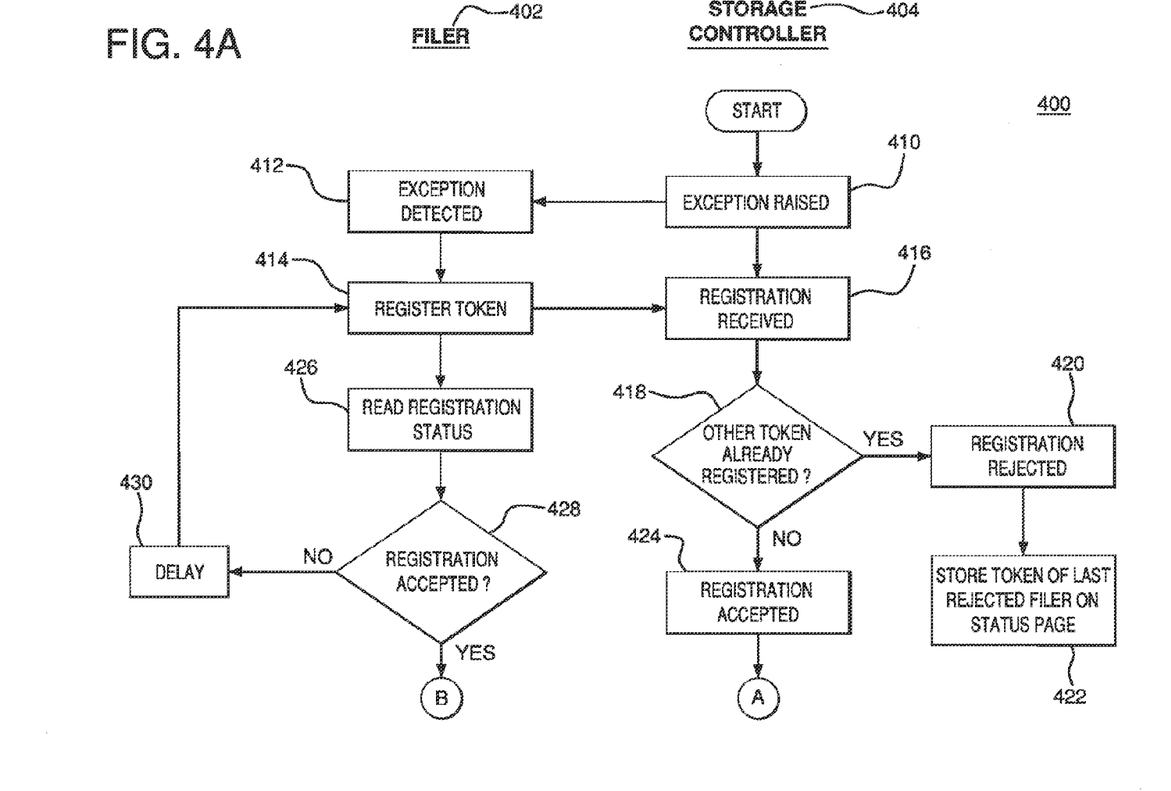
FIGS. 4A-4B are a flowchart of a method for a filer to read exception data from a storage controller.
Figure 4B:
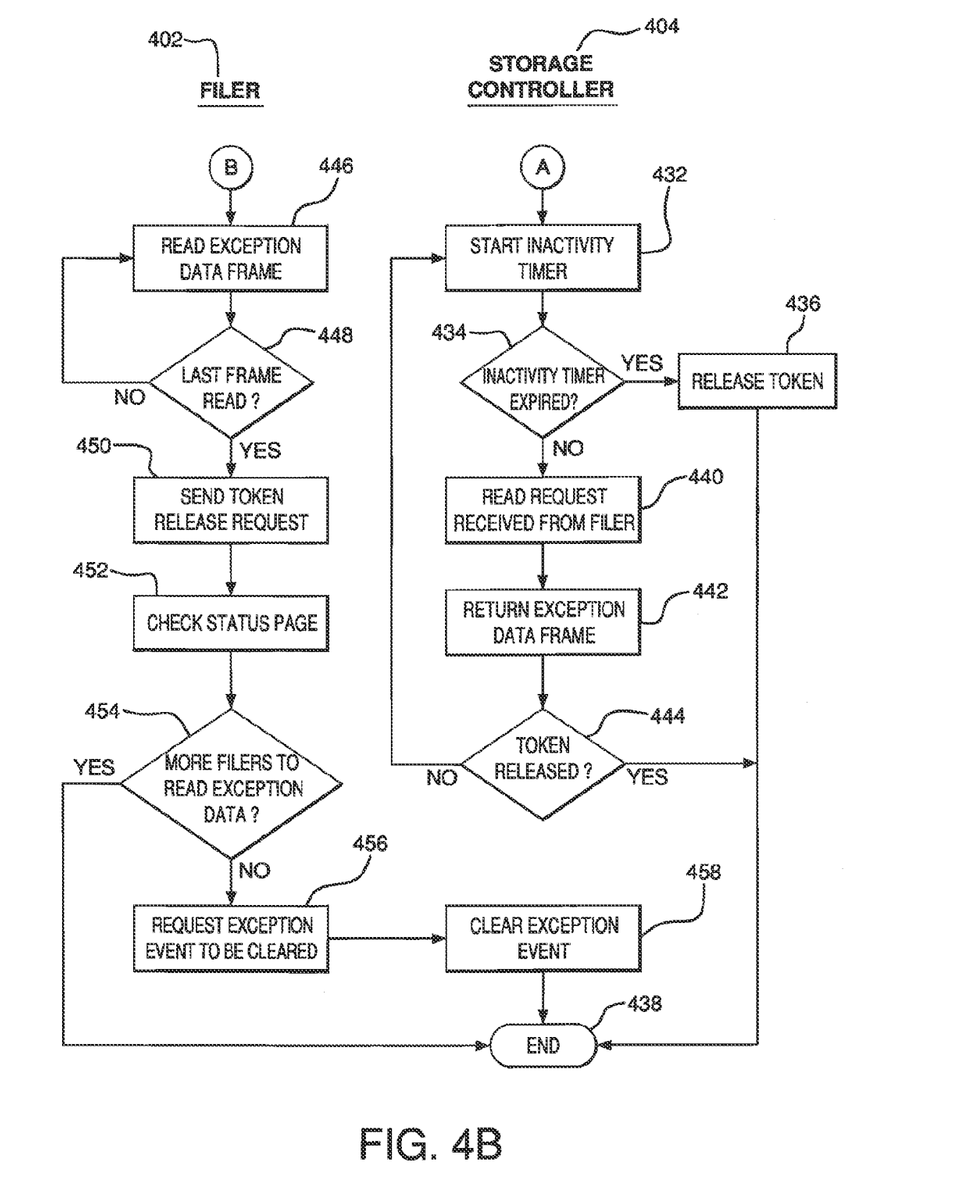

FIG. 4 is a flowchart of a method 400 for a filer 402 to read exception data from a storage controller 404. It is noted that while only one filer is shown in FIG. 4, a storage controller may be connected to many filers (as shown in FIG. 1), and each filer will operate in a similar manner. It is also noted that the controller 404 still operates normally (i.e., performs all of the functions that the controller would otherwise be capable of performing) while the filer 402 retrieves the data.

An exception is raised (i.e., generated) on the controller 404 (step 410). The controller 404 generates an exception event based on a variety of circumstances that the controller can detect during operation. For example, an exception event can be based on an ASIC failure, a memory subsystem failure, a processor failure, a disk failure, a logic inversion (such as a lack of an event occurring), and similar events. It is noted that the storage controller 404 can base an exception event upon one or multiple events occurring. For instance, it may not be useful to trigger an exception based on a single event, but if two events occur simultaneously, that may be worth triggering an exception. One skilled in the art will understand that anything that the controller can detect can be the basis for an exception event. Based on the occurrence of an exception event, the controller 404 collects diagnostic data relating to the event.

The filer 402 detects the exception asserted by the controller 404 (step 412). In one embodiment, the filer 402 periodically polls the controller 404 to detect a status change. The filer 402 can access a status page (which is a predefined section of memory) in the controller 404 every ten seconds, for example, to determine if an exception has been raised. One skilled in the art could readily implement other mechanisms for informing the filer 402 of the exception raised by the controller 404, without affecting the operation of the present invention.

Upon detecting the exception event, the filer 402 registers a unique token identifier with the controller 404 (step 414). To be able to identify the particular filer that is attempting to read the data, each filer needs to have a unique token. In one embodiment, the token is a system identifier (ID) value. For example, the system ID is a unique 64 bit value that is stored in non-volatile random access memory (NVRAM) in the filer.

The controller 404 receives the registration token from the filer 402 (step 416). A determination is made whether another filer's token is currently registered at the controller 404 (step 418). If another filer is currently registered at the controller, then the filer 402's registration request is rejected (step 420) and the token of the last rejected filer is stored on the status page in the controller 404 (step 422). By storing the token of the last rejected filer, the controller will be able to know if all of the filers connected to it have read the exception data, as will be described in greater detail below. If no other filer is currently registered at the controller 404, then the filer 402's registration is accepted (step 424).

The process of registering the filer 402's token with the controller 404 is a semaphoring mechanism used to retrieve the exception data. The token is written to the controller 404 to attempt to acquire the logging semaphore. The controller 404 writes the filer's token to the status page. If there is only one filer, then that filer will win the semaphore (i.e., have its token written to the status page) and will be able to read the data. If there are N filers, one of the N filers that is attempting to write its token is going to win the semaphore. The other N−1 filers will not win the semaphore and will have to wait to read the data. Each filer tries to write its token first and then tries to read the token back from the controller's status page to see if the token that is set is its token. If the token matches the filer's token, then the filer knows that it can start retrieving the data. Otherwise, the filer knows that it needs to continue to try to write its token to acquire the semaphore.

After the filer 402 has registered its token with the controller 404, the filer 402 reads the registration status information from the status page on the controller 404 (step 426). It is noted that the filer 402 can read the registration status immediately after attempting to register its token with the controller 404. In an alternate embodiment, there can be a short delay from the time the filer 402 attempts to register its token and the time when it reads the registration status. The method 400 will operate in a similar manner if there is a delay or not. When reading the registration status from the controller 404, the filer 402 retrieves the token for the filer that is currently registered with the controller 404. The filer 402 compares the read token with its own token to determine if its registration request has been accepted (step 428).

If the filer 402 was not registered with the controller 404, the filer 402 will delay for a predetermined period of time (step 430) before retrying to register its token with the controller 404 (step 414). The delay is used as a back-off mechanism to permit a currently registered filer to have time to read the data. In one embodiment of the invention, the predetermined period of time for the back-off is ten seconds. A person skilled in the art would appreciate that a longer delay or a shorter delay could be used for the back-off without affecting the operation of the invention.

This back-off mechanism is lightweight in terms of overhead because it includes only two input/output (IO) requests, one request to attempt to set the token and one request to read the token and then the filer waits for a predetermined period of time if the filer does not win the semaphore. It is noted that during the delay period, the other enclosure services available to the filer are still fully active; the exception data retrieval is just one activity performed by the system.

After the token is registered, the controller 404 starts an inactivity timer to monitor a read request from the filer 402 (step 432). The timer is checked to see if it has expired (step 434). If the timer has expired, then the current token is released (step 436) and the method terminates (step 438). For example, if the filer 402 does not issue a read request within 30 seconds after its registration was accepted or within 30 seconds of the last read request, the controller 404 releases the registered filer's token so that a waiting filer can be registered to retrieve the exception data. This mechanism addresses a problem in which the current filer fails for some reason and is unable to continue reading the exception data. This registered filer failure problem is described in more detail in connection with FIG. 6. A person skilled in the art would readily understand that different time periods could be used by the controller 404 without affecting the operation of the invention.

Using the inactivity timer addresses the read activity from the controller's perspective, as opposed to a multiple filer perspective. The timer ensures that if the filer that owns the semaphore starts trying to read the data and if it crashes or otherwise fails to read all of the data, then the controller 404 will time out and automatically release the semaphore. By releasing the semaphore, the controller 404 effectively "kicks out" a stalled filer. The semaphore is then available for polling by one of the other filers that is attempting to read the data.

If the timer has not expired (step 434), the controller 404 receives a read request from the filer 402 (step 440) and returns the exception data frame to the filer 402 (step 442). If the filer 402 has not completed reading the exception data, then the token is held by the controller 404 until the filer 402 has completed reading all of the exception data. If the controller 404 has released the token (step 444) then the method terminates (step 438). If the controller 404 has not released the token, then the inactivity timer is reset (step 432) to wait for the next read request from the filer 402.

If the filer 402's registration is accepted (step 428), the filer 402 begins reading the exception data from the controller (step 446). In one embodiment, the filer sends successive status read requests to the controller to retrieve the exception data from the controller. One skilled in the art would readily be able to devise other ways for the filer to read the exception data from the controller.

After each frame (or packet; either of these terms refers to a unit amount of data that can be transmitted at one time, based on system configuration and/or constraints) of the data is read, a check is made to determine whether the filer 402 has read the last frame of the exception data (step 448). In one implementation, the exception data is in a multi-frame format; one skilled in the art could readily design a different format (possibly a single frame or packet) to communicate the same exception data. The last data frame may be signaled by a stop bit set in the status page by the controller 404.

Sometimes, the controller 404 may abort the retrieval process if cannot deliver the data for some reason. In one embodiment (not shown in FIG. 4), the controller 404 communicates the abort status to the filer 402 by setting an abort bit in the status page. When the filer 402 detects that the abort bit set in the status page, it will restart reading the data by re-issuing a read request to the controller 404. Upon detecting the abort bit, the filer 402 sends a request to the controller 404 to reset the transaction, which requests the controller 404 to resend the data starting from the beginning of the data on a subsequent read request issued by the filer 402.

If the last frame of the exception data has not been reached, then the next exception data frame is read (step 446). If the last exception data frame has been read (step 448), then the filer 402 sends a token release request to the controller 404 to indicate that it has completed reading the exception data (step 450).

After the filer 402 has completed reading the exception data, it checks the status page in the controller 404 (step 452). By reading the status page in the controller 404, the filer 402 can determine whether there are filers that are waiting to read the exception data (step 454). These filers include all of the filers that did not previously win the semaphore. If there are more filers waiting to read the exception data, then the token for the filer 402 is released and the method terminates (step 438). It is noted that the method terminates only in regard to the filer 402; the remaining filers operate in a similar manner. If all of the filers have read the exception data (step 454), then the filer 402 issues a request to the controller 404 to clear the exception event (step 456), the controller 404 clears the exception event (step 458), and the method terminates (step 438). By requesting that the exception event be cleared, the filer 402 indicates to the controller 404 that all of the filers have read the exception data and that the exception event can be cleared or otherwise indicated that it is no longer an active event. As part of clearing the exception event, the controller 404 clears the event (i.e., indicates that the event is no longer "active") and erases the exception data from its buffer.

System for Reading Exception Data from a Storage Controller

Figure 5:
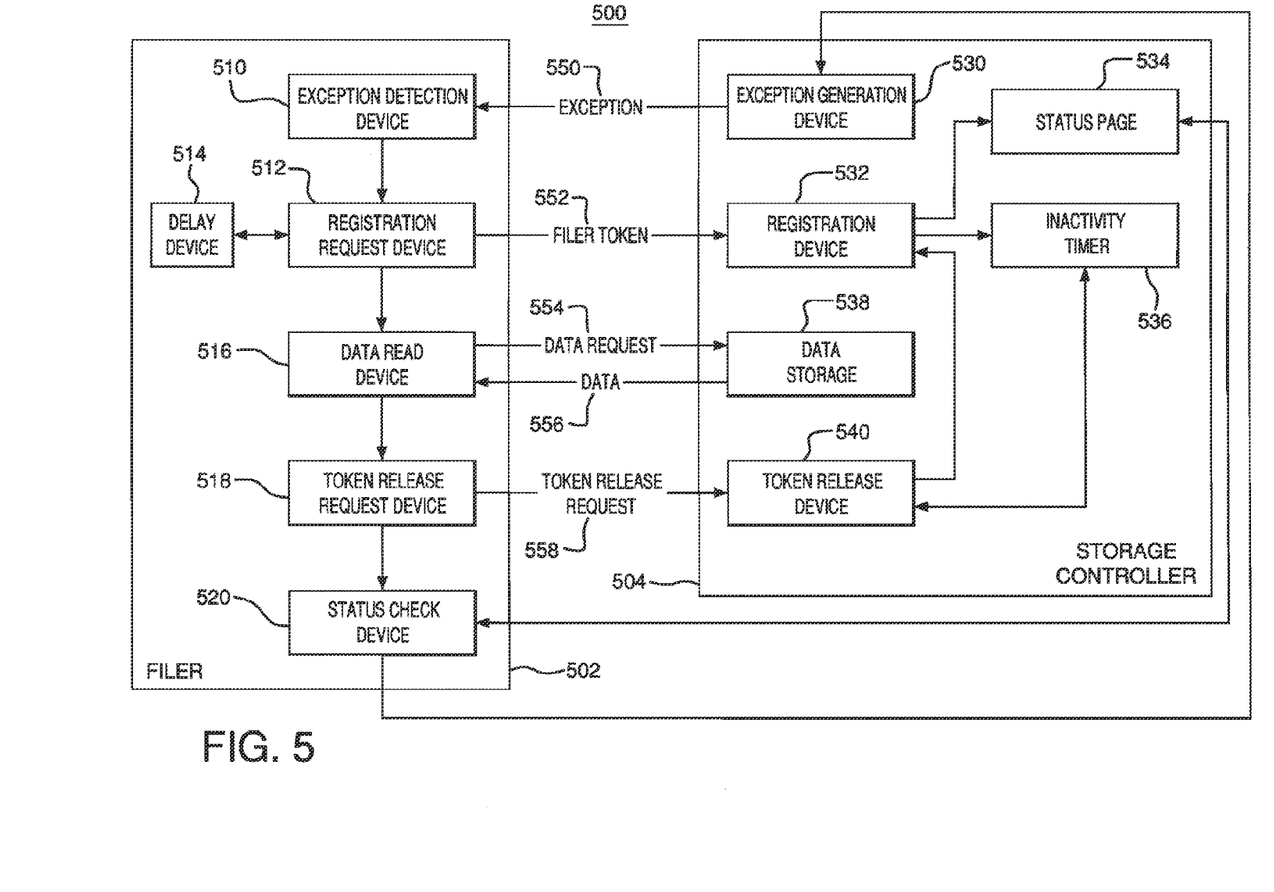
FIG. 5 is a block diagram of a filer configured to read exception data from a storage controller.

FIG. 5 is a block diagram of a system 500 including a filer 502 configured to read exception data from a storage controller 504. The filer 502 includes an exception detection device 510, a registration request device 512, a delay device 514, a data read device 516, a token release request device 518, and a status check device 520. The storage controller 504 includes an exception generation device 530, a registration device 532, a status page 534, an inactivity timer 536, a data storage 538, and a token release device 540.

In operation, the exception generation device 530 generates an exception 550 based on activity in the storage controller 504. The exception 550 is detected by the exception detection device 510 in the filer 502. Upon detecting the exception 550, the exception detection device 510 informs the registration request device 512 that the filer 502 needs to register with the controller 504 to retrieve the exception data. It is noted that any form of inter-process communication can be used by the devices in the filer 502 to communicate with each other, such as message passing or shared memory.

The registration request device 512 in the filer 502 sends the filer's token 552 to the registration device 532 in the controller 504. The registration device 532 in the controller 504 attempts to register the filer 502 by writing the filer's token to the status page 534. After a predetermined period of time, the registration request device 512 checks with the registration device 532 to see if the filer 502 was successfully registered. The registration device 532 checks the status page 534 to read the filer token stored there and returns this value to the filer 502. If the filer 502 was not successfully registered, the delay device 514 waits for a predetermined period of time before the registration request device 512 again attempts to register the filer 502. In one embodiment, the predetermined period of time is ten seconds. The status page 534 is used to determine whether all filers connected to the controller 504 have read the exception data.

If the filer 502 is successfully registered, the registration device 532 signals the inactivity timer 536 to start and the registration request device 512 signals the data read device 516 to begin reading the exception data. The data read device 516 sends a data request 554 to the data storage 538 and begins reading the data 556. After finishing reading the data 556, the data read device 516 signals the token release request device 518 that all of the exception data has been read. The token release request device 518 sends a token release request 558 to the token release device 540 in the controller 504. Upon receipt of the token release request from the filer 502, the token release device 540 signals the registration device 532 that the filer 502 has completed reading the exception data and resets the inactivity timer 534.

If the inactivity timer 536 expires before the filer 502 has completed reading the exception data 556 (indicating a potential problem at the filer 502), the timer 536 signals the token release device 540 to release the filer 502's token, terminating the access to the data by filer 502. The token release device 540 notifies the registration device 532 that the filer 502 should be de-registered and resets the registration device 532 so that another filer can attempt to read the exception data. When the registration device 532 receives the reset notification, it also removes the filer token 552 from the status page.

The token release request device 518 also signals the status check device 520 that the filer 502 has finished reading the exception data. The status check device 520 checks the status page 534 in the controller 504 to determine whether all of the filers have read the exception data. If the status page 534 contains an identifier for another filer, then the registration process is repeated for another filer that is waiting to read the exception data. If the status page 534 contains an indication that all of the filers have read the exception data (meaning that the filer 502 is the last filer to read the data), then the status check device 520 signals the exception generation device 530 to clear the exception event.

Filer States while Reading Exception Data from a Storage Controller

Figure 6:
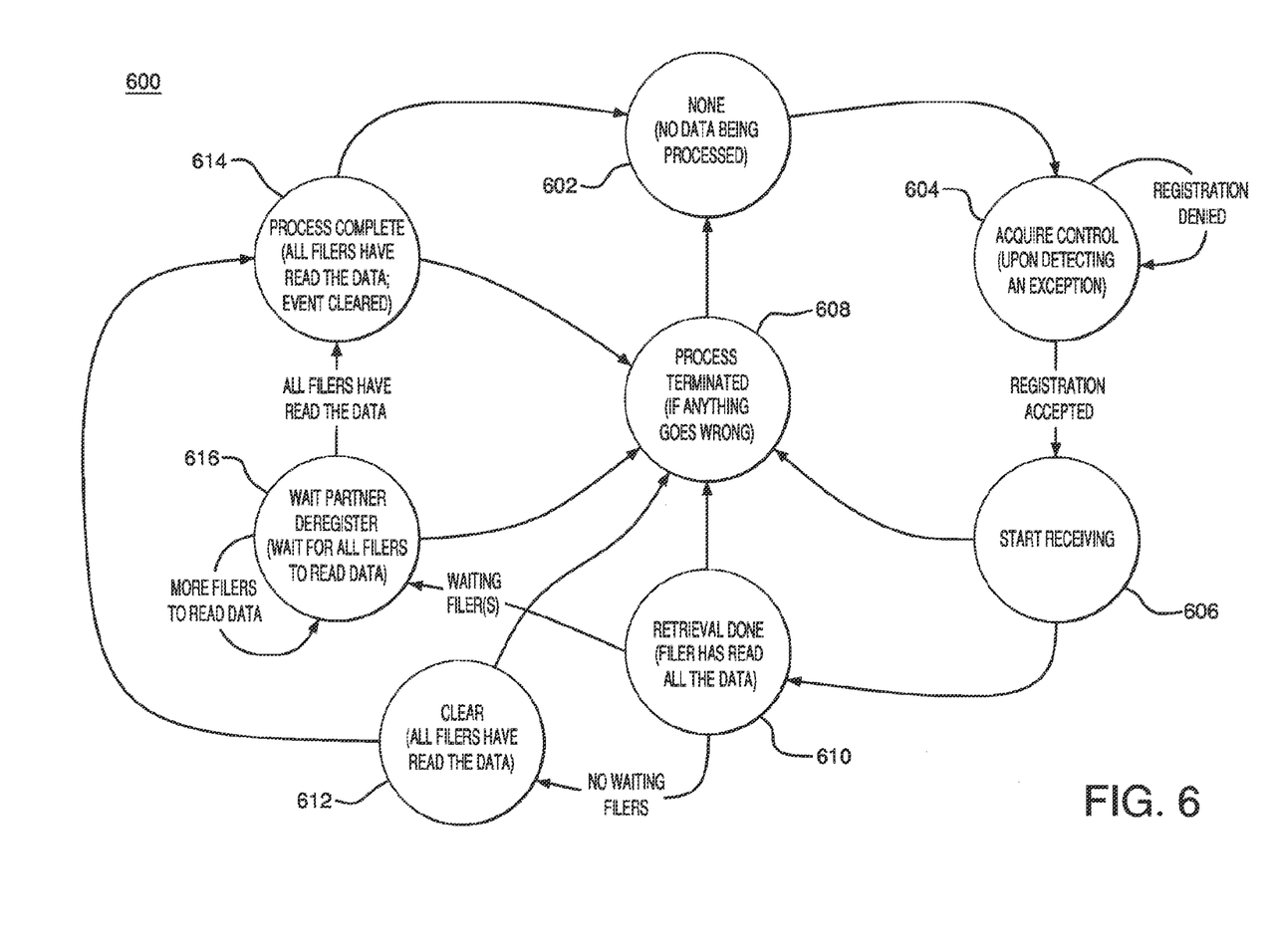
FIG. 6 is a state diagram of a filer while reading exception data from a storage controller.

FIG. 6 is a state diagram 600 of a filer while reading exception data from a storage controller. The filer begins in the None state 602, in which no exception data is being processed. Upon detecting that an exception has been raised, the filer transitions to an Acquire Control state 604. While in the Acquire Control state, the filer attempts to register with the controller to read the exception data. If the filer's registration attempt is denied, the filer will remain in the Acquire Control state until it is successfully registered.

Once the filer is registered with the controller to read the exception data, it moves to a Start Receiving state 606, in which the filer reads the exception data from the controller. If an error occurs during the read process, the filer enters a Process Terminated state 608, in which any necessary "clean up" functions are performed and the filer returns to the None state 602. If the exception has not been cleared, the filer will re-enter the Acquire Control state 604 to attempt to complete reading the exception data.

After reading all of the exception data in the Start Receiving state 606, the filer transitions to a Retrieval Done state 610. In the Retrieval Done state 610, the filer checks a status page in the controller to determine if there are any other filers that are waiting to read the exception data. If an error occurs while in this state, the filer enters the Process Terminated state 608, as described above. If there are no waiting filers, then the filer moves into a Clear state 612. A filer that is in the Clear state 612 is the last filer to retrieve the exception data. If an error occurs while in this state, the filer enters the Process Terminated state 608, as described above. In the Clear state 612, the filer sends an acknowledgement to the controller that all of the data has been retrieved by all of the filers and then enters a Process Complete state 614. In the Process Complete state 614, the filer performs any necessary "clean up" functions and the filer returns to the None state 602. If an error occurs while in this state, the filer enters the Process Terminated state 608, as described above.

In the Retrieval Done state 610, if there are any filers waiting to read the exception data, the filer transitions to a Wait Partner Deregister state 616. Before making the transition to the Wait Partner Deregister state 616, the filer releases its token so that the controller can register the next waiting filer. In the Wait Partner Deregister state 616, the filer checks the status page in the controller to determine if there are any other filers that are waiting to read the exception data. If an error occurs while in this state, the filer enters the Process Terminated state 608, as described above. If there are no waiting filers, then the filer moves into the Process Complete state 614. If there are waiting filers, then the filer remains in the Wait Partner Deregister state 616.

There are two particular error cases that are noted: a registered filer failure and a waiting filer failure. A registered filer failure occurs when a waiting filer gets stuck in the Acquire Control state 604 if the registered filer currently reading the data goes away (e.g., panics) before releasing its registered ID. To prevent the waiting filer from getting stuck in the Acquire Control state 604, the controller will de-register the registered filer when one of the following three conditions occurs.

(1) The registered filer does not send a read data request within a predetermined time (in one embodiment, 30 seconds) after the controller accepts the filer's ID.

(2) The registered filer does not check the status page within a predetermined time (in one embodiment, 30 seconds) after the read data request was issued.

(3) The registered filer does not check the status page within a predetermined time (in one embodiment, 30 seconds) of the last read data request.

In regard to the waiting filer failure, assume that filer 1, after completing reading the data and releasing its ID, enters the Wait Partner Deregister state 616 where it polls the status page on the controller to check if any waiting filers are registered. If the status page indicates that the waiting filer (as indicated by the ID stored in the status page) has not been registered after a predetermined period of time (in one embodiment, three minutes), filer 1 will timeout of the Wait Partner Deregister state 616 and transition to the Process Complete state 614.

Storage Controller States while Managing Access to Exception Data

Figure 7:
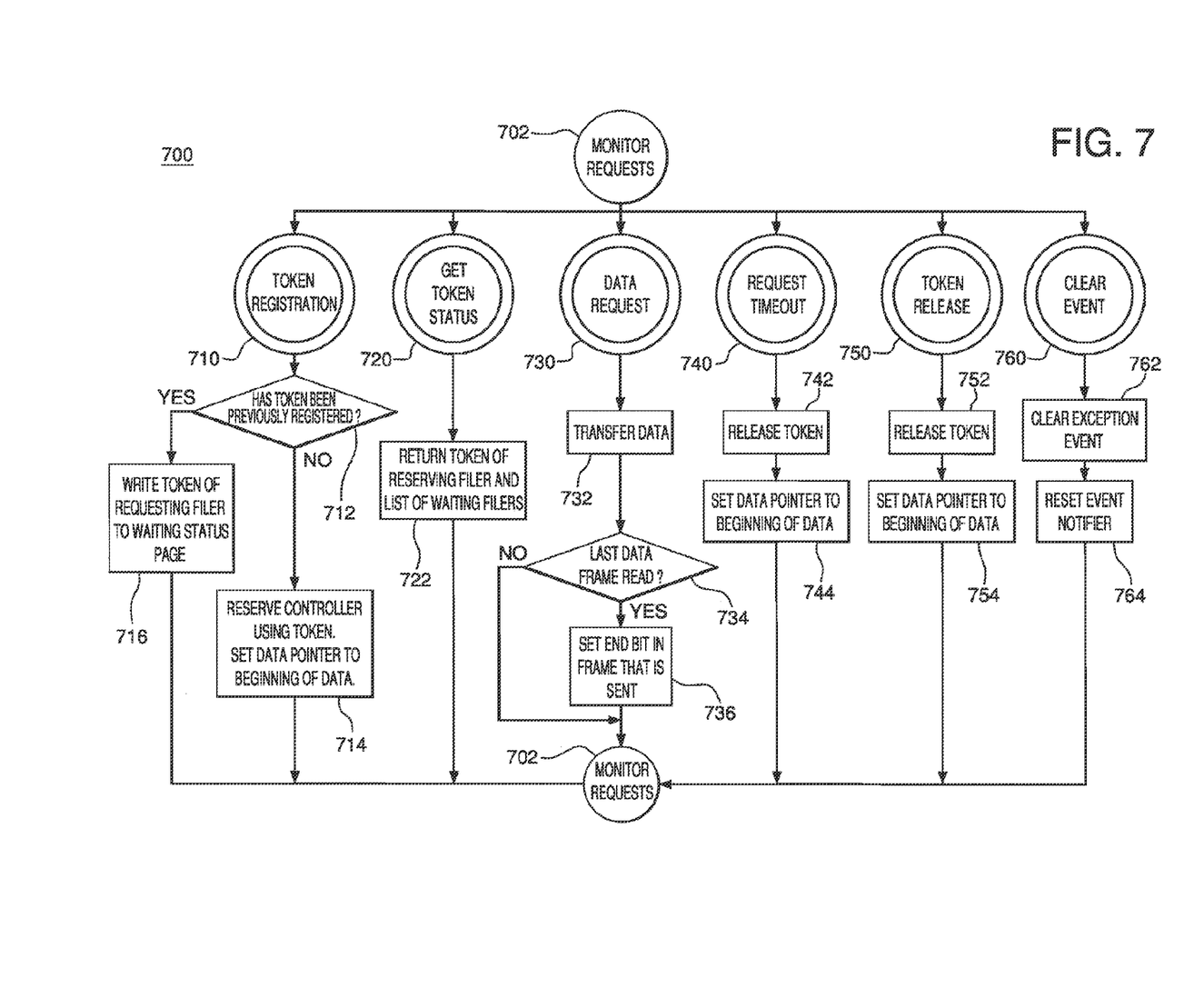
FIG. 7 is a state diagram of a storage controller managing access to exception data.

FIG. 7 is a state diagram 700 of a storage controller managing access to exception data. The storage controller begins in a monitor requests state 702, in which the storage controller waits to receive requests relating to the exception data. When the storage controller receives a token registration attempt from a filer, the storage controller enters a token registration state 710. The storage controller determines whether the token has been previously registered by a filer (step 712). If the token has not been previously registered by a filer, the controller registers the token of the requesting filer and sets the data pointer for the exception data to the beginning of the exception data (step 714). The controller then returns to the monitor requests state 702. If the token has been registered by another filer (step 712), the controller writes the token of the requesting filer to the waiting status page (step 716) and returns to the monitor requests state 702.

When a filer wants to determine if its token has been registered with the storage controller, the filer requests the token status from the controller. Upon receiving a token status request from a filer, the controller enters a get token status state 720, in which the controller returns a table containing the filer that won the token registration along with a list of the filers that failed to register its token with the controller (if any) (step 722). After returning the information, the controller returns to the monitor requests state 702.

When a registered filer requests to read the exception data, the controller enters a data request state 730. In the data request state, the controller readies a frame of the exception data to be transferred to the filer (step 732). Prior to sending the data frame, the controller determines if the current data frame is the last frame of the exception data (step 734). If the current data frame is the last frame of the exception data, the controller sets an end bit in the frame to indicate that it is the last frame of the exception data (step 736). The data frame is then sent (whether the end bit is set or not) and the controller returns to the monitor requests state 702.

If a registered filer does not send a subsequent request to the storage controller (e.g., an initial data request after being registered or another data request before all of the exception data has been read) within a predetermined period of time, the storage controller enters a request timeout state 740. In the request timeout state, the controller releases the token of the registered filer (step 742) and resets the data pointer for the exception data to the beginning of the data (step 744). The controller then returns to the monitor requests state 702.

When a registered filer has completed reading the exception data, the storage controller enters a token release state 750. The controller releases the token of the registered filer (step 752) and resets the data pointer for the exception data to the beginning of the data (step 754). The controller then returns to the monitor requests state 702.

Once all of the filers have read the exception data, the last filer to read the exception data sends a request to the storage controller to clear the exception event. Upon receiving this request, the controller enters a clear event state 760. The controller clears the exception event (step 762), resets the event notifier (step 764), and returns to the monitor requests state 702.

The present invention can be implemented in a computer program tangibly embodied in a computer-readable storage medium containing a set of instructions for execution by a processor or a general purpose computer; and method steps of the invention can be performed by a processor executing a program of instructions to perform functions of the invention by operating on input data and generating output data. Suitable processors include, by way of example, both general and special purpose processors. Typically, a processor will receive instructions and data from a ROM, a random access memory (RAM), and/or a storage device. Storage devices suitable for embodying computer program instructions and data include all forms of non-volatile memory, including by way of example semiconductor memory devices, magnetic media such as internal hard disks and removable disks, magneto-optical media, and optical media such as CD-ROM disks and digital versatile disks (DVDs). In addition, while the illustrative embodiments may be implemented in computer software, the functions within the illustrative embodiments may alternatively be embodied in part or in whole using hardware components such as Application Specific Integrated Circuits (ASICs), Field Programmable Gate Arrays (FPGAs), or other hardware, or in some combination of hardware components and software components.

While specific embodiments of the present invention have been shown and described, many modifications and variations could be made by one skilled in the art without departing from the scope of the invention. The above description serves to illustrate and not limit the particular invention in any way.

What is claimed is:

1. A method for reading exception data by a storage server from a storage controller communicating with a plurality of storage servers that provide storage services to network storage clients, comprising:
   communicating by the plurality of storage servers with the storage controller for detecting an exception event generated by the storage controller managing a plurality of storage devices, the exception event being associated with at least one of an application specific integrated circuit (ASIC) specific failure, a memory failure, a processor failure, or a disk failure;
   storing the exception data related to the exception event and a status for the exception event by the storage controller;
   detecting the exception event at the storage server after the storage controller updates the status of the exception event;
   after detecting the exception event, attempting to register the storage server with the storage controller by sending a unique token from the storage server to the storage controller, whereby one storage server is registered with the storage controller at a time;
   determining whether another storage server is already registered with the storage controller;
   denying registration if the other storage server is already registered with the storage controller;
   allowing registration if no other storage server is registered with the storage controller;
   if the storage server is registered with the storage controller, then reading the exception data by the storage server;
   tracking if another of the plurality of servers is waiting to read the exception data;
   based on the tracking, registering another server after the storage server has read the exception data or if the storage server becomes inactive as indicated by a timer; and
   indicating that the exception event is inactive by the storage controller after all the plurality of servers have read the exception data.

2. The method according to claim 1, wherein if the storage server is denied registration with the storage controller, then waiting a predetermined period of time before the storage server again attempts to register with the storage controller.

3. The method according to claim 1, wherein if the storage server is denied registration with the storage controller, then storing the storage server's token by the storage controller, whereby the storage server can determine whether all storage servers have read the exception data.

4. The method according to claim 1, wherein the detecting step includes the storage server periodically polling the storage controller to detect the exception event.

5. The method according to claim 1, wherein if the storage server is registered with the storage controller, the method further comprises:
   using the timer at the storage controller to detect activity by the storage server; and
   releasing the storage server's registration if the timer expires without any activity from the registered storage server.

6. The method according to claim 5, further comprising: resetting the timer if activity from the registered storage server is detected by the storage controller.

7. The method of claim 1, wherein to indicate the exception event is inactive, the storage controller updates the status of the exception event and deletes the exception data from a memory of the storage controller.

8. A non-transitory, machine readable medium having stored thereon instructions comprising machine executable code for reading exception data by a storage server from a storage controller communicating with a plurality of storage servers that provide storage services to network storage clients, which when executed by a machine, causes the machine to:
   communicate by the plurality of storage servers with the storage controller for detecting an exception event generated by the storage controller managing a plurality of storage devices, the exception event being associated with at least one of an application specific integrated circuit (ASIC) specific failure, a memory failure, a processor failure, or a disk failure;

store the exception data related to the exception event and a status for the exception event by the storage controller;

detect the exception event at the storage server after the storage controller updates the status of the exception event;

after detecting the exception event, attempt to register the storage server with the storage controller by sending a unique token from the storage server to the storage controller, whereby one storage server is registered with the storage controller at a time;

determine whether another storage server is already registered with the storage controller;

deny registration if the other storage server is already registered with the storage controller;

allow registration if no other storage server is registered with the storage controller;

if the storage server is registered with the controller, then reading the exception data by the storage server;

track if another of the plurality of servers is waiting to read the exception data;

based on the tracking, register another server after the storage server has read the exception data or if the storage server becomes inactive as indicated by a timer; and indicate by the storage controller that the exception event is inactive, after all the plurality of servers have read the exception data.

9. The non-transitory, machine readable medium of claim 8, wherein to indicate the exception event is inactive, the storage controller updates the status of the exception event and deletes the exception data from a memory of the storage controller.

10. The non-transitory, machine readable medium of claim 8, wherein if the storage server is registered with the storage controller then the timer is used by the storage controller to detect activity by the storage server; and the storage server's registration is released if the timer expires without any activity from the registered storage server.

11. The non-transitory, machine readable medium of claim 10, wherein the timer is reset if activity from the registered storage server is detected by the storage controller.

12. The non-transitory, machine readable medium of claim 8, wherein the storage server periodically polls the storage controller to detect the exception event.

13. The non-transitory, machine readable medium of claim 8, wherein if the storage server is denied registration with the storage controller, then the storage server waits a predetermined period of time before the storage server again attempts to register with the storage controller.

14. The non-transitory, machine readable medium of claim 8, wherein if the storage server is denied registration with the storage controller, then the storage server's token is stored by the storage controller to determine whether all storage servers have read the exception data.

15. A system for reading exception data by a storage server from a storage controller communicating with a plurality of storage servers that provide access services to network storage clients, comprising:

a memory containing machine readable medium comprising machine executable code having stored thereon instructions; and a processor module for the storage controller coupled to the memory, the processor module executes the machine executable code to:

communicate by the plurality of storage servers with the storage controller for detecting an exception event generated by the processor of the storage controller managing a plurality of storage devices, the exception event being associated with at least one of an application specific integrated circuit (ASIC) specific failure, a memory failure, a processor failure, or a disk failure;

store the exception data related to the exception event and a status for the exception event by the processor module of the storage controller;

detect the exception event at the storage server after the processor module of storage controller updates the status of the exception event;

after detecting the exception event, attempt to register the storage server with the storage controller by sending a unique token from the storage server to the storage controller, whereby one storage server is registered with the storage controller at a time;

determine whether another storage server is already registered with the storage controller;

deny registration if the other storage server is already registered with the storage controller;

allow registration if no other storage server is registered with the storage controller;

if the storage server is registered with the storage controller, then read the exception data by the storage server;

track if another of the plurality of servers is waiting to read the exception data;

based on the tracking, register the another server after the storage server has read the exception data or if the storage server becomes inactive as indicated by a timer; and indicate by the storage controller that the exception event is inactive, after all the plurality of servers have read the exception data.

16. The system of claim 15, wherein to indicate the exception event is inactive, the storage controller updates the status of the exception event and deletes the exception data from a memory of the storage controller.

17. The system of claim 15, wherein if the storage server is registered with the storage controller then the timer is used by the storage controller to detect activity by the storage server; and the storage server's registration is released if the timer expires without any activity from the registered storage server.

18. The system of claim 17, wherein the timer is reset if activity from the registered storage server is detected by the storage controller.

19. The system of claim 15, wherein the storage server periodically polls the storage controller to detect the exception event.

20. The system of claim 15, wherein if the storage server is denied registration with the storage controller, then the storage server waits a predetermined period of time before the storage server again attempts to register with the storage controller.

21. The system of claim 15, wherein if the storage server is denied registration with the storage controller, then the storage server's token is stored by the storage controller to determine whether all storage servers have read the exception data.

* * * * *